United States Patent
Hashimoto et al.

(10) Patent No.: US 9,964,839 B2
(45) Date of Patent: May 8, 2018

(54) PROJECTION SYSTEM, PROJECTOR APPARATUS, IMAGING APPARATUS, AND PROJECTION METHOD

(71) Applicants: MegaChips Corporation, Osaka-shi (JP); The University of Electro-Communications, Chofu-shi (JP)

(72) Inventors: Naoki Hashimoto, Tokyo (JP); Chiharu Kohari, Tokyo (JP); Yuki Haraguchi, Chiba (JP); Fumiya Shingu, San Jose, CA (US); Motoyasu Tanaka, Osaka (JP)

(73) Assignees: MegaChips Corporation, Osaka-shi (JP); The University of Electro-Communications, Chofu-shi (JP)

(*) Notice: Subject to any disclaimer, the term of this patent is extended or adjusted under 35 U.S.C. 154(b) by 0 days. days.

(21) Appl. No.: 15/720,167

(22) Filed: Sep. 29, 2017

(65) Prior Publication Data
US 2018/0024423 A1    Jan. 25, 2018

Related U.S. Application Data

(63) Continuation of application No. PCT/JP2016/058679, filed on Mar. 18, 2016.

(30) Foreign Application Priority Data

Mar. 31, 2015 (JP) ................................. 2015-070677

(51) Int. Cl.
G03B 21/14 (2006.01)
H04N 9/31 (2006.01)
(Continued)

(52) U.S. Cl.
CPC ............. *G03B 21/13* (2013.01); *G03B 37/04* (2013.01); *G06T 3/005* (2013.01); *H04N 9/312* (2013.01);
(Continued)

(58) Field of Classification Search
CPC ........ G09G 3/2003; G09G 3/003; H04N 9/31; H04N 9/3102; H04N 9/312; H04N 9/3182;
(Continued)

(56) References Cited

U.S. PATENT DOCUMENTS

| | | | | | |
|---|---|---|---|---|---|
| 7,639,849 | B2* | 12/2009 | Kimpe | ..................... | G09G 3/20 345/690 |
| 8,287,130 | B2* | 10/2012 | Kaneko | ................ | G03B 21/005 250/205 |

(Continued)

FOREIGN PATENT DOCUMENTS

| | | |
|---|---|---|
| JP | 2002-072359 A | 3/2002 |
| JP | 2005-055830 A | 3/2005 |

(Continued)

OTHER PUBLICATIONS

Written Opinion of the International Searching Authority issued in International Application No. PCT/JP2016/058679 dated Jun. 7, 2016.

*Primary Examiner* — William C Dowling
(74) *Attorney, Agent, or Firm* — Oblon, McClelland, Maier & Neustadt, L.L.P.

(57) ABSTRACT

Even when a high-performance imaging apparatus is not used, luminance unevenness and color unevenness of an image (video) projected on a projection plane by the projection type projector apparatus are appropriately reduced. Using a coefficient Br ($0 \leq Br \leq 1$) set by a coefficient setting unit, the projection system obtains, based on the gamma (Continued)

characteristic of the entire system of the projection system, a target image for reducing the number of pixels saturated when the image is projected. Then, the projection system performs correction processing using the obtained target image based on the gamma characteristic of the entire system of the projection system and a white value. This reduces the number of saturated pixels of the projected image in the projection system. Furthermore, even in a case or similar cases when a captured image obtained by capturing a projected image has a bad S/N ratio, image projection processing that does not cause a user discomfort in viewing the projected image (or captured image) is achieved.

8 Claims, 6 Drawing Sheets

(51) Int. Cl.
*G03B 21/13* (2006.01)
*G06T 3/00* (2006.01)
*G03B 37/04* (2006.01)

(52) U.S. Cl.
CPC ......... *H04N 9/3147* (2013.01); *H04N 9/3176* (2013.01); *H04N 9/3182* (2013.01)

(58) Field of Classification Search
CPC ....... G02F 1/133; G03B 21/14; G03B 21/005; G03B 21/006
See application file for complete search history.

(56) References Cited

U.S. PATENT DOCUMENTS

| | | | |
|---|---|---|---|
| 2002/0024640 A1* | 2/2002 | Ioka | G03B 21/13 353/94 |
| 2011/0018897 A1* | 1/2011 | Uchiyama | H04N 9/3176 345/619 |
| 2017/0289508 A1* | 10/2017 | Fujioka | H04N 9/3105 |

FOREIGN PATENT DOCUMENTS

| | | |
|---|---|---|
| JP | 2005-244835 A | 9/2005 |
| JP | 2009-187002 A | 8/2009 |
| JP | 2011-205199 A | 10/2011 |
| JP | 2012-028877 A | 2/2012 |

\* cited by examiner

PROJECTION SYSTEM, PROJECTOR APPARATUS, IMAGING APPARATUS, AND PROJECTION METHOD

CROSS-REFERENCE TO RELATED APPLICATIONS

This application is a continuation of International Application No. PCT/JP2016/058679, filed Mar. 18, 2016, which is based upon and claims priority to Japanese Application No. 2015-070677, filed Mar. 31, 2015, the entire contents of which are incorporated herein by reference.

TECHNICAL FIELD

The present invention relates to a technique for appropriately displaying an image (video) projected by a projection type projector apparatus.

BACKGROUND ART

Techniques for reducing luminance unevenness and color unevenness of an image (video) projected onto a projection plane by a projection type projector apparatus have been developed.

For example, Patent Literature 1 discloses a technique of reducing the luminance unevenness and color unevenness of a projected image (video) by correcting the image (video) in projecting the image using a projection type projector apparatus in consideration of the reflection characteristics of the projection plane.

The technique of Patent Literature 1 (Japanese Unexamined Patent Publication No. 2012-28877) measures a luminance value of each color component for each pixel of a captured image obtained by capturing a projected image, and then calculates a light distribution map, which indicates a change rate of luminance with respect to a luminance reference point in a video, based on a luminance value of each color component for each measured pixel. The technique of Patent Literature 1 then normalize the measured luminance value of each color component for each pixel using the light distribution map to calculate a response function, and corrects the luminance value of each color component for each pixel in the inputted video signal using the response function and the light distribution map to obtain a corrected video signal. The technique of Patent Literature 1 then projects the corrected video signal onto the projection plane.

DISCLOSURE OF INVENTION

Technical Problem

To calculate a highly accurate light distribution map and a highly accurate response function, it is necessary for the above technique to capture the projected image with a high-performance imaging device. In other words, the above technique requires a high-performance imaging device that can obtain a captured image (captured video) with good imaging sensitivity and a good S/N ratio. Further, the above technique assumes that the dynamic range of the projected image is wide, and requires a high illuminance projector apparatus. For this reason, it is difficult to apply the above technique to a projector apparatus by which an image with a narrow dynamic range and a low-luminance image is projected.

It is an object of the present invention to provide a projection system, projector apparatus, and a program that appropriately reduce the luminance unevenness and color unevenness of an image (video) projected onto the projection plane by a projection-type projector apparatus without using a high-luminance (high-brightness) projector apparatus or a high-performance imaging device.

Solution to Problem

To solve the above problems, a first aspect of the invention provides a projection system for projecting an image obtained by performing a predetermined process on an input image. The projection system includes a projection unit, an imaging unit, a gamma characteristic obtaining unit, a pixel mapping unit, a response characteristic obtaining unit, a coefficient setting unit, a target image obtaining unit, and a correction unit.

The projection unit is configured to project an image onto a projection target.

The imaging unit is configured to obtain an image projected by the projection unit as a captured image.

The gamma characteristic obtaining unit is configured to obtain a gamma characteristic determined by an optical system of the projection unit and an optical system of the imaging unit.

The pixel mapping unit is configured to obtain pixel mapping data based on a projection image, which is an image projected from the projection unit, and a captured image obtained by the imaging unit, the pixel mapping data being data for pixel-to-pixel correspondence between pixels in the captured image and pixels in the projected image.

The response characteristic obtaining unit is configured to obtain, for each pixel, a white value that is a pixel value of a captured image obtained by capturing a W100%-image projected by the projection unit using the imaging unit and a black value that is a pixel value of a captured image obtained by capturing a W0%-image projected by the projection unit using the imaging unit, and obtain a representative white value that is a representative value derived from the obtained white value and a representative black value that is a representative value derived from the obtained black value.

The coefficient setting unit is configured to set a first coefficient.

The target image obtaining unit is configured to obtain a target image from the input image based on the gamma characteristic obtained by the gamma characteristic obtaining unit and the first coefficient.

The correction unit is configured to perform correction processing on the target image based on the gamma characteristic obtained by the gamma characteristic obtaining unit, the white value, and the black value to obtain a corrected image.

The target image obtaining unit obtains the target image such that saturated pixels decrease in an image that is predicted to be captured by the imaging unit when the projection unit projects the corrected image.

DESCRIPTION OF THE PREFERRED EMBODIMENTS

First Embodiment

A first embodiment will now be described with reference to the drawings.

1.1 Structure of Projection System

Figure 1:
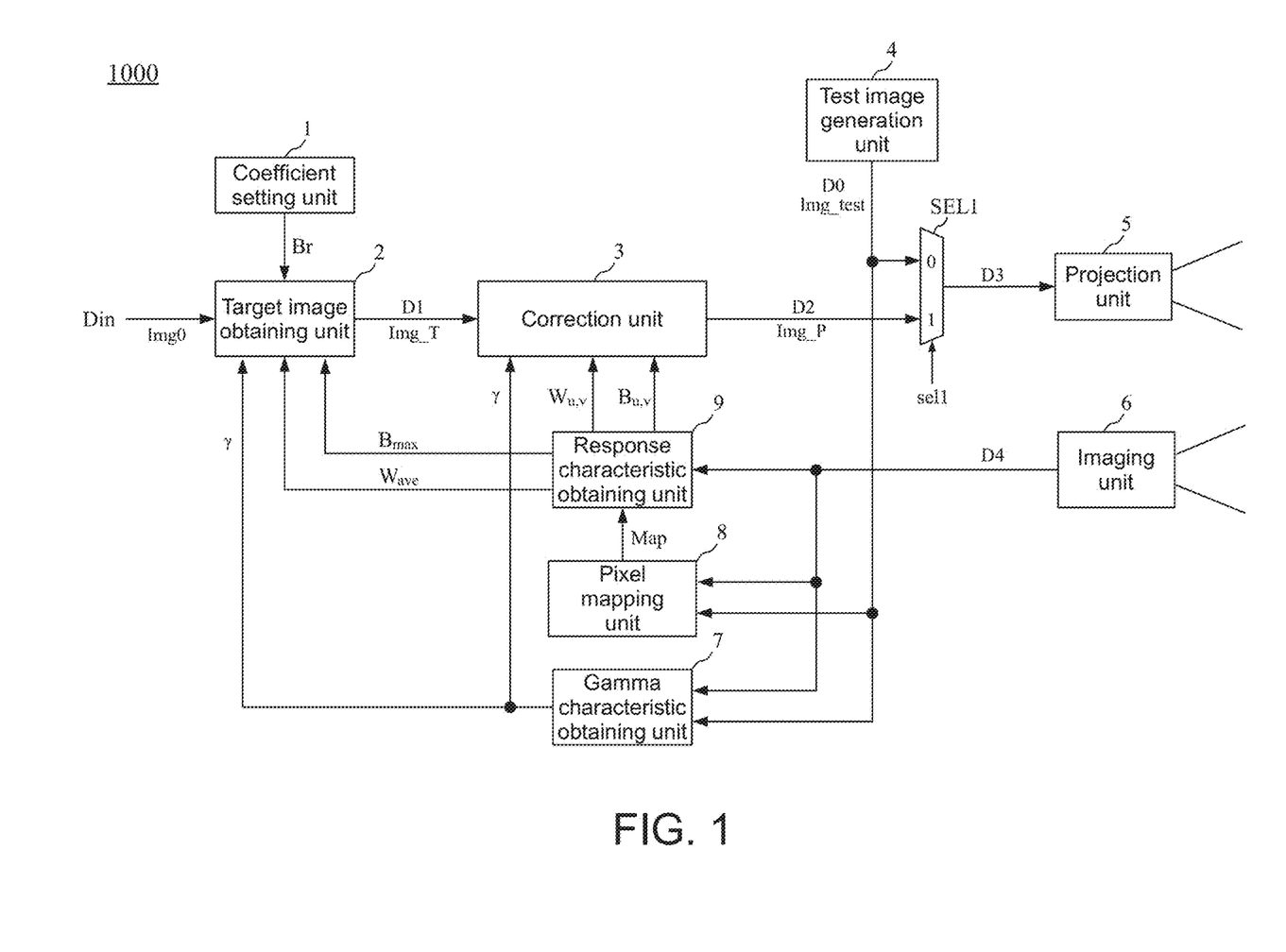
FIG. 1 is a schematic diagram showing the structure of a projection system 1000 according to a first embodiment.

FIG. 1 is a schematic diagram showing the structure of a projection system 1000 according to the first embodiment.

As shown in FIG. 1, the projection system 1000 includes a coefficient setting unit 1, a target image obtaining unit 2, a correction unit 3, a test image generation unit 4, a selector SEL1, a projection unit 5, an imaging unit 6, a gamma characteristic obtaining unit 7, a pixel mapping unit 8, and a response characteristic obtaining unit 9.

The coefficient setting unit 1 sets a coefficient Br to a predetermined value and transmits the set coefficient Br to the target image obtaining unit 2.

The target image obtaining unit 2 receives an image signal Din (image Img0) inputted into the projection system 1000, the coefficient Br transmitted from the coefficient setting unit 1, a gamma value γ (information γ on a gamma value) transmitted from the gamma characteristic obtaining unit 7, and information on a black value (e.g., Bmax) for a target image and information on a white value (e.g. Wave) for the target image that are transmitted from the response characteristic obtaining unit 9. The target image obtaining unit 2 generates a target image Img_T from the image signal Din (image Img0) based on the coefficient Br, the gamma value γ, the black value Bmax for the target image, and the white value Wave for the target image, and then transmits an image signal forming the generated image target image Img_T to the correction unit 3 as an image signal D1.

The correction unit 3 receives the image signal D1 transmitted from the target image obtaining unit 2, the gamma value γ (information γ on the gamma value) transmitted from the gamma characteristic obtaining unit 7, and a white value (a white value of a pixel at the coordinates (u,v) in an image is referred to as $W_{u,v}$) and a black value (a black value of a pixel at the coordinates (u,v) in an image is referred to as $B_{u,v}$) transmitted from the response characteristic obtaining unit 9. The correction unit 3 performs correction processing on the image signal D1 using the gamma value γ, the white value and the black value transmitted from the response characteristic obtaining unit 9. The correction unit 3 then transmits the processed image signal (the image signal forming the image Img_P) to the selector SEL1 as the image signal D2.

The test image generation unit 4 generates test images of the following (1) to (4), and then transmits an image signal forming the generated image to the selector SEL1, the gamma characteristic obtaining unit 7, and the pixel mapping unit 8, as an image signal D0.

(1) a test image Img_for_gamma for obtaining a gamma value of the entire system of the optical system of the projection system 1000.

(2) a test image Img_for_map for performing pixel mapping between a projection image projected from the projection unit 5 and a captured image obtained by capturing the projected image with the imaging unit 6.

(3) W100%-image Img_w100

(4) W0%-image Img_w0

Note that "W100%-image" is an image in which pixel values of all the pixels included in the image are an upper limit value in the range of possible pixel values. For example, when the pixel value is 8-bit data ranging from 0 through 255, the pixel value of all the pixels included in the "W100%-image" is "255".

"W0%-image" is an image in which pixel values of all the pixels included in the image are a lower limit value in the range of possible pixel values. For example, when the pixel value is 8-bit data ranging from 0 through 255, the pixel value of all the pixels included in the "W0%-image" is "0".

The selector SEL1 receives the image signal D0 transmitted from the test image generation unit 4, the image signal D2 transmitted from the correction unit 3, and the selection signal sel1. The selection signal sel1 is generated by a control unit (not shown). The selector SEL1 selects one of the image signal D0 and the image signal D2 in accordance with the selection signal sel1 and transmits the selected image signal as an image signal D3 to the projection unit 5.

The projection unit 5 has an optical system for projecting an image. The projection unit 5 receives the image signal D3 transmitted from the selector SEL1 and projects the received image signal D3 onto a projection target.

The imaging unit 6 has an optical system for imaging the image projected by the projection unit 5. The imaging unit 6 obtains a captured image by capturing an image projected by the projecting unit 5, and transmits an image signal forming the captured image to the gamma characteristic obtaining unit 7, the pixel mapping unit 8, and the response characteristic obtaining unit 9, as an image signal D4.

The gamma characteristic obtaining unit 7 receives the image signal D4 transmitted from the imaging unit 6 and the image signal D0 transmitted from the test image generation unit 4. The gamma characteristic obtaining unit 7 determines (estimates) the gamma characteristic of the entire system of the projection system 1000 (the optical system of the projection unit 5 and the optical system of the imaging unit 6), based on the image signal D4 and the image signal D0. The gamma characteristic obtaining unit 7 then obtains the gamma value γ from the determined gamma characteristic, and transmits the obtained gamma value γ to the target image obtaining unit 2 and the correction unit 3.

The pixel mapping unit 8 receives the image signal D4 transmitted from the imaging unit 6 and the image signal D0 transmitted from the test image generation unit 4. The pixel mapping unit 8 performs pixel mapping by determining which pixel in the image formed by the image signal D0 corresponds to which pixel in the image formed by the image signal D4. The pixel mapping unit 8 obtains map information Map on mapping of all the pixels, and then transmits the obtained information Map to the response characteristic obtaining unit 9.

The response characteristic obtaining unit 9 receives the image signal D4 transmitted from the imaging unit 6 and the map information Map transmitted from the pixel mapping unit 8.

The response characteristic obtaining unit 9 obtains a white value (e.g. Wave) for the target image from the image signal D4 forming the captured image when a W100%-image is projected, and then transmits the obtained white value (e.g. Wave) for the target image to the target image obtaining unit 2. Further, the response characteristic obtaining unit 9 obtains a black value (e.g. Bmax) for the target image from the image signal D4 forming the captured image when a W0%-image is projected, and then transmits the obtained black value (e.g. Bmax) for the target image to the target image obtaining unit 2.

Assuming that a target pixel to be processed in the correction unit 3 is a pixel Px(u, v) whose coordinates in the image are (u, v), the response characteristic obtaining unit 9 specifies a pixel Px(x, y) corresponding to the pixel Px(u, v) in the projected image based on the map inform Map. The response characteristic obtaining unit 9 then obtains a white value of the pixel Px(x, y) in the captured image corresponding to the pixel Px(u, v) in the projected image (the pixel value of the pixel Px(x, y) in the captured image when the W100%-image is projected) as a white value $W_{u,v}$ and transmits the obtained white value $W_{u,v}$ to the correction unit 3.

Further, the response characteristic obtaining unit 9 obtains a black value of the pixel Px(x, y) in the captured image corresponding to the pixel Px(u, v) in the projected image (the pixel value of the pixel Px(x, y) in the captured image when the W0%-image is projected) as a black value $B_{u,v}$, and transmits the obtained black value $B_{u,v}$ to the correction unit 3.

1.2 Operation of Projection System

The operation of the projection system 1000 with the above-described structure will now be described.

Figure 2:
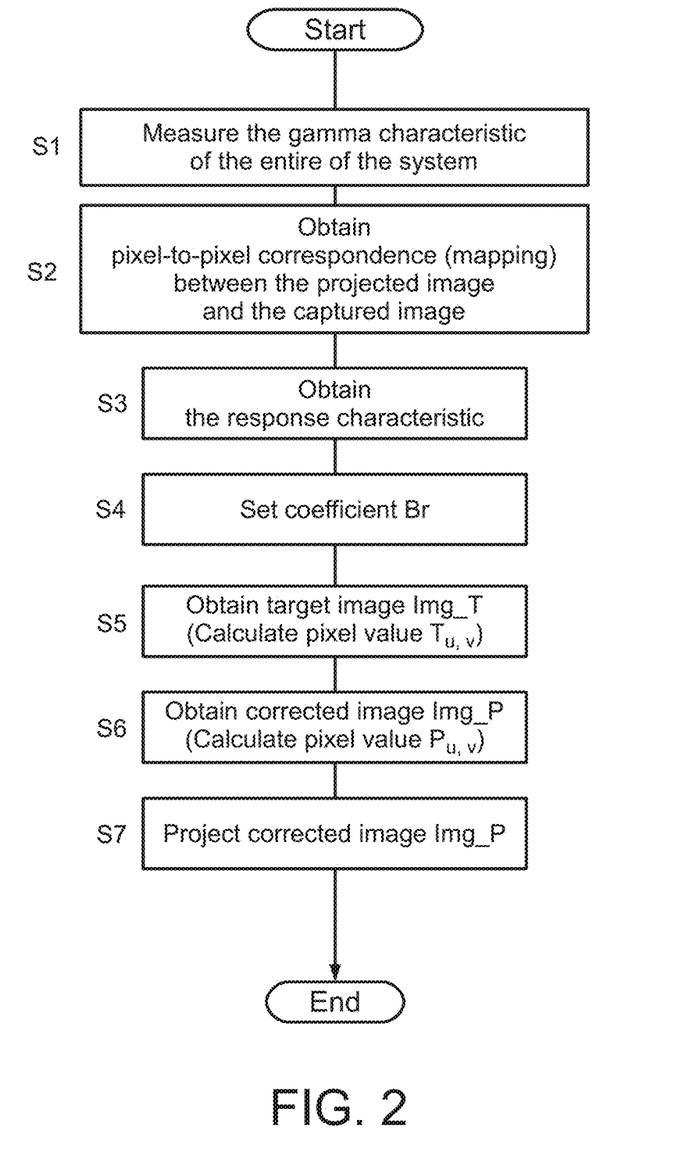
FIG. 2 is a flowchart showing processing of the projection system 1000.

FIG. 2 is a flowchart showing processing of the projection system 1000.

The operation of the projection system 1000 will now be described with reference to the flowchart of FIG. 2.

In the following, a case in which an image signal defined in the RGB color space is processed in the projection system 1000 will be described.

Step S1:

In step S1, processing for determining (estimating) the gamma characteristic of the entire system of the projection system 1000 (the optical system of the projection unit 5 and the optical system of the imaging unit 6) is performed.

The test image generation unit 4 generates a test image Img_for_gamma for obtaining the gamma value of the entire system of the optical system of the projection system 1000 and then transmits the image signal D0 forming the generated test image Img_for_gamma to the selector SEL1.

The control unit generates a selection signal sel1 for selecting the terminal 0 of the selector SEL1 and transmits it to the selector SEL1.

In accordance with the selection signal sel1, the selector SEL1 selects the terminal 0 and then transmits, to the projection unit 5, the image signal D0 forming the test image Img_for_gamma transmitted from the test image generation unit 4.

The projection unit 5 projects the test image Img_for_gamma onto the projection target.

The test image Img_for_gamma is, for example, an image every pixel of which has only the R component and an identical pixel value. In other words, assuming that the R component value of the pixel Px(u, v) of the test image Img_for_gamma is R(Px(u, v)), the G component value of the pixel Px(u, v) is G(Px(u, v)), and the B component value of the pixel Px(u, v) is B(Px(u, v)), in the test image Img_for_gamma, the following formulae are satisfied:

$$R(Px(u,v)) = A1 \, (0 \leq A1 \leq 255)$$

$$G(Px(u,v)) = 0$$

$$B(Px(u,v)) = 0.$$

Note that the test image Img_for_gamma is an 8-bit image, and the pixel value of the image is assumed to range from 0 through 255.

The test image generation unit 4 generates a test image having only the R component as described above, and the generated test image is projected by the projection unit 5.

The imaging unit 6 then transmits the image signal D4 forming the captured image obtained by imaging the test image having only the R component projected by the projection unit 5 to the gamma characteristic obtaining unit 7.

The gamma characteristic obtaining unit 7 performs processing for determining a gamma characteristic based on the image signal D4 transmitted from the imaging unit 6.

Repeatedly performing the above processing while changing the value of the R component value A1 of the pixel Px(u, v) of the test image Img_for_gamma allows the gamma characteristic to be determined (estimated) by the gamma characteristic obtaining unit 7.

In other words, examining changes in pixel values of pixels of the captured image when the R component value of the pixel of the projection image projected from the projection unit 5 is changed in the range from 0 through 255 allows the gamma characteristic to be determined (estimated).

Assuming that the R component value of the pixel of the projection image projected by the projection unit 5 is xR_prj and the R component value of the pixel of the captured image of the projection image is yR_cap, the following Formula is satisfied:

$$yR\_cap = \alpha \times (xR\_prj/255)^{\gamma} + \beta$$

α, β: constant

In other words, the above formula is a formula showing the characteristic of the entire system of the projection system 1000 (the optical system of the projection unit 5 and the optical system of the imaging unit 6).

The test image Img_for_gamma is repeatedly projected while the R-component value A1 of the pixel Px(u, v) in the test image Img_for_gamma is being changed. In this case, the gamma characteristic obtaining unit 7 determines (estimates) the value γ of the formula representing the gamma characteristic of the entire system of the projection system 1000 (the optical system of the projection unit 5 and the optical system of the imaging unit 6) from the R-component value xR_prj of the pixel of the projected image and the R-component value yR_cap of the pixel of the captured image obtained by capturing the projected image.

The gamma value γ (the gamma value for the R component) thus obtained is transmitted from the gamma characteristic obtaining unit 7 to the target image obtaining unit 2 and the correction unit 3.

The projection system 1000 sets the test image Img_for_gamma to an image every pixel of which has only the G component and an identical pixel value, and then performs the same processing as described above, thereby obtaining a gamma value γ (a gamma value for G component). The obtained gamma value γ (gamma value for G component) is transmitted from the gamma characteristic obtaining unit 7 to the target image obtaining unit 2 and the correction unit 3.

Further, The projection system 1000 sets the test image Img_for_gamma to an image every pixel of which has only the B component and an identical pixel value, and then performs the same processing as described above, thereby obtaining a gamma value γ (a gamma value for B component). The obtained gamma value γ (gamma value for B component) is transmitted from the gamma characteristic obtaining unit 7 to the target image obtaining unit 2 and the correction unit 3.

Step S2:

In step S2, pixel matching processing between the projection image and the captured image is performed.

The test image generating unit 4 generates a test image Img_for_map for performing pixel-to-pixel correspondence between the projection image projected from the projection unit 5 and the captured image obtained by capturing the projected image with the imaging unit 6, and then transmits the image signal D0 forming the generated test image Img_for_map to the selector SEL1.

The control unit generates a selection signal sel1 for selecting the terminal 0 of the selector SEL1 and transmits it to the selector SEL1.

The selector SEL1 selects the terminal 0 in accordance with the selection signal sel1 and transmits, to the projection unit 5, the image signal D0 forming the test image Img_for_map transmitted from the test image generation unit 4.

The projection unit 5 projects the test image Img_for_map onto the projection target.

The test image Img_for_map is, for example, an image based on Gray codes (pattern of "0" and "1") or a phase pattern image (a pattern image based on a sinusoidal wave with a predetermined cycle and phase).

The imaging unit 6 transmits the image signal D4 forming the captured image obtained by capturing the test image Img_for_map projected by the projection unit 5 to the pixel mapping unit 8.

The pixel mapping unit 8 performs pixel mapping by determining which pixel in the image formed by the image signal D0 corresponds to which pixel in the image formed by the image signal D4. The pixel mapping unit 8 obtains map information Map on mapping of all the pixels, and then transmits the obtained information Map to the response characteristic obtaining unit 9.

Step S3:

In step S3, processing for obtaining response characteristics is performed.

The test image generation unit 4 generates the W100%-image Img_w100 as the test image and transmits the image signal D0 forming the generated test image Img_w100 to the selector SEL1.

The control unit generates a selection signal sel1 for selecting the terminal 0 of the selector SEL1 and transmits it to the selector SEL1.

The selector SEL1 selects the terminal 0 in accordance with the selection signal sel1 and transmits, to the projection unit 5, the image signal D0 forming the test image Img_w100 transmitted from the test image generating unit 4.

The projection unit 5 projects the test image Img_w100 onto the projection target.

The imaging unit 6 transmits the image signal D4 forming the captured image obtained by imaging the test image Img_w100 projected by the projection unit 5 to the response characteristic obtaining unit 9.

The response characteristic obtaining unit 9 calculates an average value of all the pixels of the captured image when the W100%-image is projected. The response characteristic obtaining unit 9 then obtains the calculated value as the white value Wave for the target image. The response characteristic obtaining unit 9 transmits the obtained white value Wave for the target image to the target image obtaining unit 2.

In addition, the response characteristic obtaining unit 9 holds the value of each pixel of the captured image when the W100%-image is projected. More specifically, the response characteristic obtaining unit 9 specifies, from the map information Map, the pixel P(u, v) of the projected image corresponding to the pixel Px(x, y) of the captured image when the W100%-image is projected and holds the pixel value of the pixel Px(x, y) of the captured image when the W100%-image is projected as the white value $W_{u, v}$. In response to a request from the correction unit 3, the response characteristic obtaining unit 9 transmits the held white value $W_{u, v}$ to the correction unit 3.

Further, the response characteristic obtaining unit 9 holds the value of each pixel of the captured image when the W0%-image is projected. More specifically, the response characteristic obtaining unit 9 specifies, from the map information Map, the pixel P(u, v) of the projected image corresponding to the pixel Px(x, y) of the captured image when the W0%-image is projected and holds the pixel value of the pixel Px(x, y) of the captured image when the W0%-image is projected as the white value $B_{u, v}$. In response to a request from the correction unit 3, the response characteristic obtaining unit 9 transmits the held black values $B_{u, v}$ to the correction unit 3.

Next, the test image generation unit 4 generates the W0%-image Img_w0 as the test image, and transmits the image signal D0 forming the generated test image Img_w0 to the selector SEL1.

The control unit generates a selection signal sel1 for selecting the terminal 0 of the selector SEL1 and transmits it to the selector SEL1.

The selector SEL1 selects the terminal 0 in accordance with the selection signal sel1 and transmits, to the projection unit 5, the image signal D0 forming the test image Img_w0 transmitted from the test image generating unit 4.

The projection unit 5 projects the test image Img_w0 onto the projection target.

The imaging unit 6 transmits the image signal D4 forming the captured image obtained by imaging the test image Img_w0 projected by the projection unit 5 to the response characteristic obtaining unit 9.

The response characteristic obtaining unit 9 obtains a maximum value among the pixel values of all the pixels of the captured image when the W0%-image is projected. The response characteristic obtaining unit 9 then obtains the obtained value as a black value Bmax for the target image. The response characteristic obtaining unit 9 transmits the obtained black value Bmax for the target image to the target image obtaining unit 2.

As described above, the projection system 1000 performs processing for obtaining response characteristics.

Step S4:

In step S4, the coefficient setting unit 1 sets the coefficient Br as a value satisfying $0 \leq Br \leq 1$. Then, the set coefficient Br is transmitted from the coefficient setting unit 1 to the target image obtaining unit 2.

Step S5:

In step S5, the target image obtaining unit 2 generates a target image Img_T from the image signal Din (image Img0) based on the coefficient Br, the gamma value γ, the black value Bmax for the target image, and the white value Wave for the target image. More specifically, assuming that a pixel value of a pixel at the coordinates (u, v) in the inputted image Img0 is $I_{u,v}$, and a pixel value of a pixel at the coordinates (u, v) in the target image Img_T is $T_{u,v}$, the target image obtaining unit 2 generates a target image Img_T by performing processing corresponding to the following Formula 1 or Formula 2:

Formula 1

$$T_{u,v} = Br \times W_{ave} \times \left(\frac{I_{u,v}}{255}\right)^{\gamma} \quad (1)$$

Formula 2

$$T_{u,v} = W_{ave} \times \left(\frac{Br \times I_{u,v}}{255}\right)^{\gamma} \quad (2)$$

Note that for the pixel values of the R component, the pixel values of the G component, and the pixel values of the B component of the image Img0 and the image Img_T, the above processing is performed using the gamma value for the R component, the gamma value for the G component, and the gamma value for B component, respectively.

In the above processing, Br is set to a value satisfying 0≤Br≤1, thus allowing the pixel value of each pixel of the target image Img_T to be decreased. This allows for reducing saturated pixels in the image projected from the projection unit 5, thereby achieving good image projection.

Further, the value Wave is an example; other values may be used. For example, the value Wave may be replaced with a value, such as an upper limit value, a lower limit value, a median value, or the like, for the pixel value of each pixel of the captured image when the W100%-image is projected.

Note that the target image obtaining unit 2 may generate the target image Img_T by performing processing corresponding to the following Formula 3 or Formula 4:

Formula 3

$$T_{u,v} = Br \times (W_{ave} - B_{max}) \times \left(\frac{I_{u,v}}{255}\right)^{\gamma} + B_{max} \quad (3)$$

Formula 4

$$T_{u,v} = (W_{ave} - B_{max}) \times \left(\frac{Br \times I_{u,v}}{255}\right)^{\gamma} + B_{max} \quad (4)$$

In the above Formula 3 and Formula 4, the value Wave and the value Bmax are an example; other values may be used. For example, the value Wave may be replaced with a value, such as an upper limit value, a lower limit value, a median value, or the like, for the pixel value of each pixel of the captured image when the W100%-image is projected. Further, the value Bmax may be replaced with a value, such as an average value, an upper limit value, a median value, or the like, for the pixel value of each pixel of the captured image when the W0% image is projected.

Note that Formula 1 and Formula 2 correspond to formulae obtained by substituting Bmax=0 into Formula 3 and Formula 4, respectively. Thus, performing processing corresponding to Formula 1 or Formula 2 in the target image obtaining unit 2 allows for widening the dynamic range for the target image.

The image signal D1 forming the target image Img_T generated in this way is transmitted from the target image obtaining unit 2 to the correction unit 3.

Step S6:

In step S6, the correction unit 3 performs correction processing on the image signal D1 using the gamma value γ transmitted from the gamma characteristic obtaining unit 7 and the white value $W_{u,v}$ transmitted from the response characteristic obtaining unit 9 to obtain the image Img_P after the correction processing. More specifically, assuming that the pixel value of the pixel at the coordinates (u, v) in the image of the image Img_P is $P_{u,v}$, the correction unit 3 performs processing corresponding to the following Formula 5 to obtain the image Img_P after the correction processing.

Formula 5

$$P_{u,v} = 255 \times \left(\frac{T_{u,v} - k1 \times B_{u,v}}{W_{u,v} - k2 \times B_{u,v}}\right)^{\frac{1}{\gamma}} \quad (5)$$

k1: first coefficient k1 for black value adjustment (0≤k1≤1)

k2: second coefficient k2 for black value adjustment (0≤k2≤1)

Note that the first coefficient k1 for black value adjustment and the second coefficient k2 for black value adjustment are set by, for example, a control unit (not shown).

Note that it is preferable that the correction unit 3 performs, with k1=k2=0 satisfied, the processing corresponding to the above Formula 5 to obtain the image Img_P after the correction processing.

It is also conceivable to obtain the image Img_P after the correction processing by performing processing corresponding to the following Formula 6:

Formula 6

$$P_{u,v} = 255 \times \left(\frac{T_{u,v} - B_{u,v}}{W_{u,v} - B_{u,v}}\right)^{\frac{1}{\gamma}} \quad (6)$$

$B_{u,v}$: Black value of the pixel Px(x, y) in the captured image corresponding to the pixel Px(u, v) of the projection image (pixel value of the pixel Px(x, y) of the captured image when the W0%-image is projected)

When the processing corresponding to the above Formula 6 is performed and the projection unit 5, the imaging unit 6, or the like have high performance, a preferable result is obtained; however, in a case or similar cases when a captured image obtained by capturing a projected image projected by the projection unit 5 has a bad S/N ratio, performing processing corresponding to Formula 5 causes less discomfort to a user when the user views a projected image (or a captured image) than performing processing corresponding to Formula 6. This fact was found by the inventors of the present application.

Thus, to obtain a good projected image (a good captured image), the correction unit 3 of the projection system 1000 performs the processing corresponding to Formula 5 (processing with $B_{u,v}$=0 (processing with k1=k2=0)).

Note that for the pixel values of the R component, the pixel values of the G component, and the pixel values of the B component of the image Img_T and the image Img_P, the above processing corresponding to Formula 5 is performed using the gamma value for the R component, the gamma value for the G component, and the gamma value for B component, respectively.

The image signal D2 forming the image Img_P after the correction processing thus generated is transmitted from the correction unit 3 to the selector SEL1.

Step S7:

In step S7, the control unit generates a selection signal sel1 for selecting the terminal 1 of the selector SEL1. In accordance with the selection signal sel1, the selector SEL1 selects the terminal 1, and transmits the image signal D2 transmitted from the correction unit 3 to the projection unit 5.

The projection unit 5 projects the image signal D2 (image Img_P) onto the projection target.

As described above, the projection system 1000 performs the processing.

An image actually processed in the projection system 1000 is shown in a figure.

Figure 3:
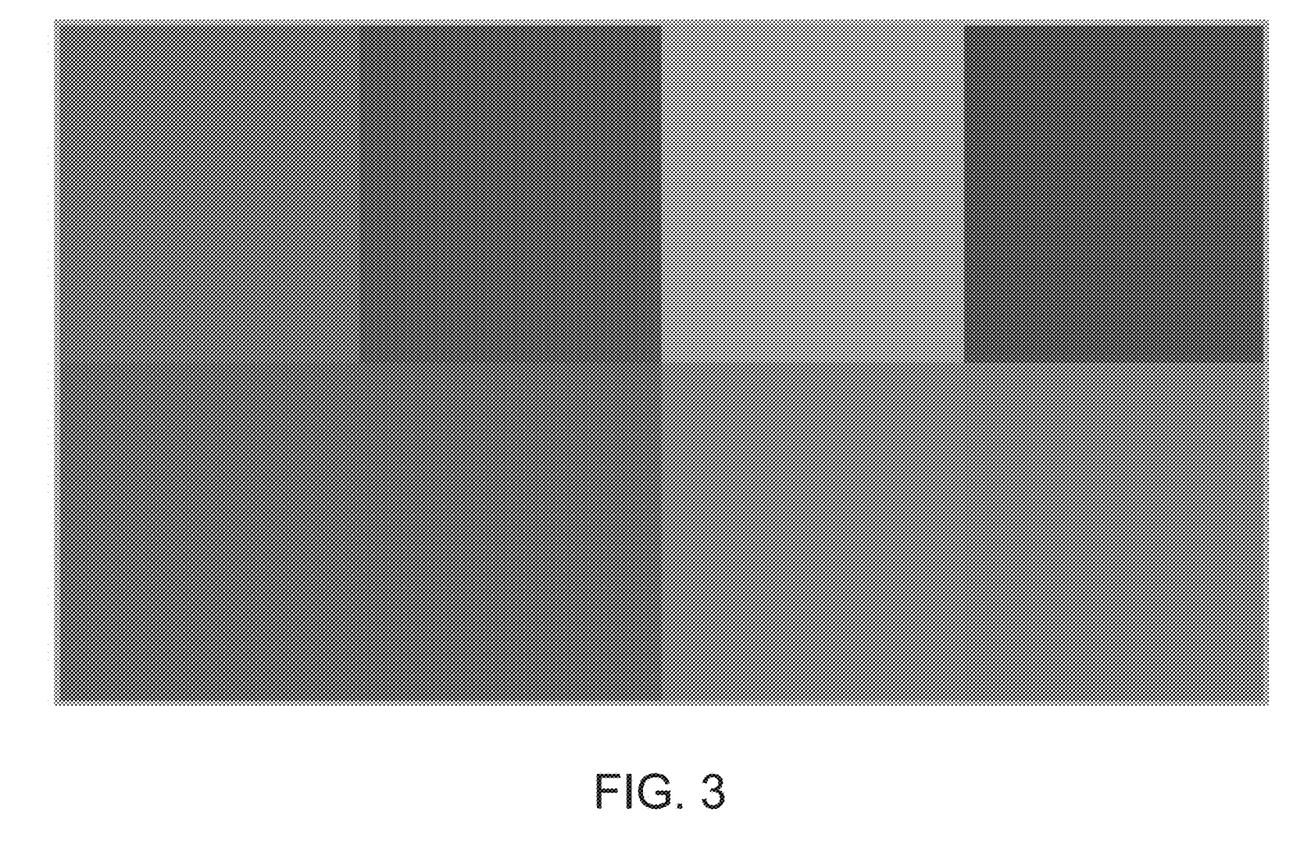
FIG. 3 shows an example of an image Img0 (8-bit image) to be inputted into the projection system 1000.

FIG. 3 shows an example of an image Img0 (8-bit image) to be inputted into the projection system 1000. More specifically, the image Img0 is composed of eight patterns (single color patterns). Assuming that eight patterns are set as Pattern 1, Pattern 2, Pattern 3, and Pattern 4 from the left to the right in the upper row of FIG. 3, and are set as Pattern 5, Pattern 6, Pattern 7, and Pattern 8 from the left to the right in the lower row of FIG. 3, the colors (R component value, G component value, and B component value) of the eight patterns are as follows:

Pattern 1: R=150; G=120; B=30;
Pattern 2: R=80; G=90; B=120;
Pattern 3: R=120; G=180; B=210;
Pattern 4: R=150; G=50; B=100;
Pattern 5: R=0; G=150; B=110;
Pattern 6: R=50; G=120; B=200;
Pattern 7: R=20; G=200; B=100;
Pattern 8: R=120; G=150; B=90.

Figure 4:
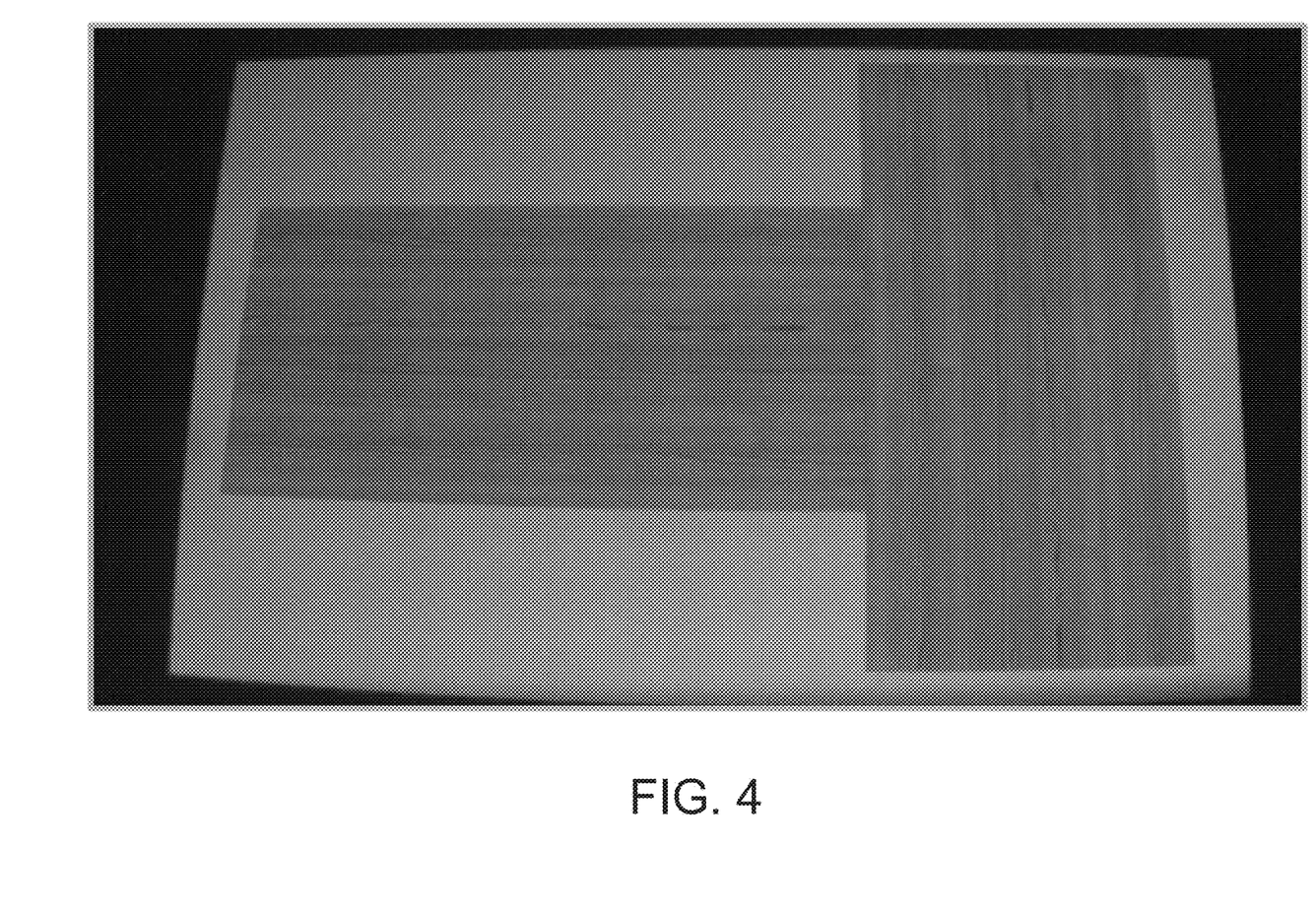
FIG. 4 shows an image (projection target) to be projected in the projection system 1000.

FIG. 4 shows an image (projection target) to be projected in the projection system 1000.

Figure 5:
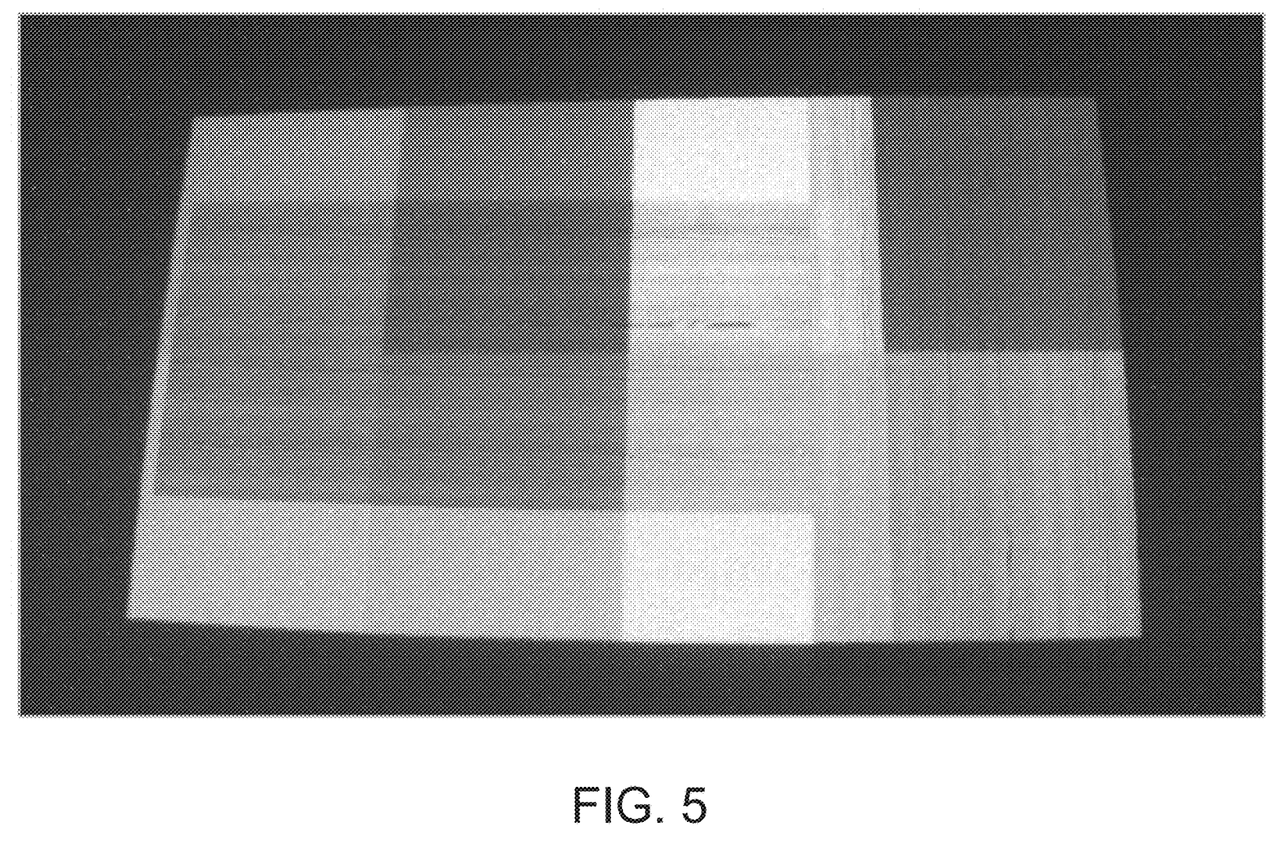
FIG. 5 shows a captured image obtained by projecting the image Img0 shown in FIG. 3 onto the projection target shown in FIG. 4 without performing the processing in the target image obtaining unit 2 and the processing in the correction unit 3.

FIG. 5 shows a captured image obtained by projecting the image Img0 shown in FIG. 3 onto the projection target shown in FIG. 4 without performing the processing in the target image obtaining unit 2 and the processing in the correction unit 3.

Figure 6:
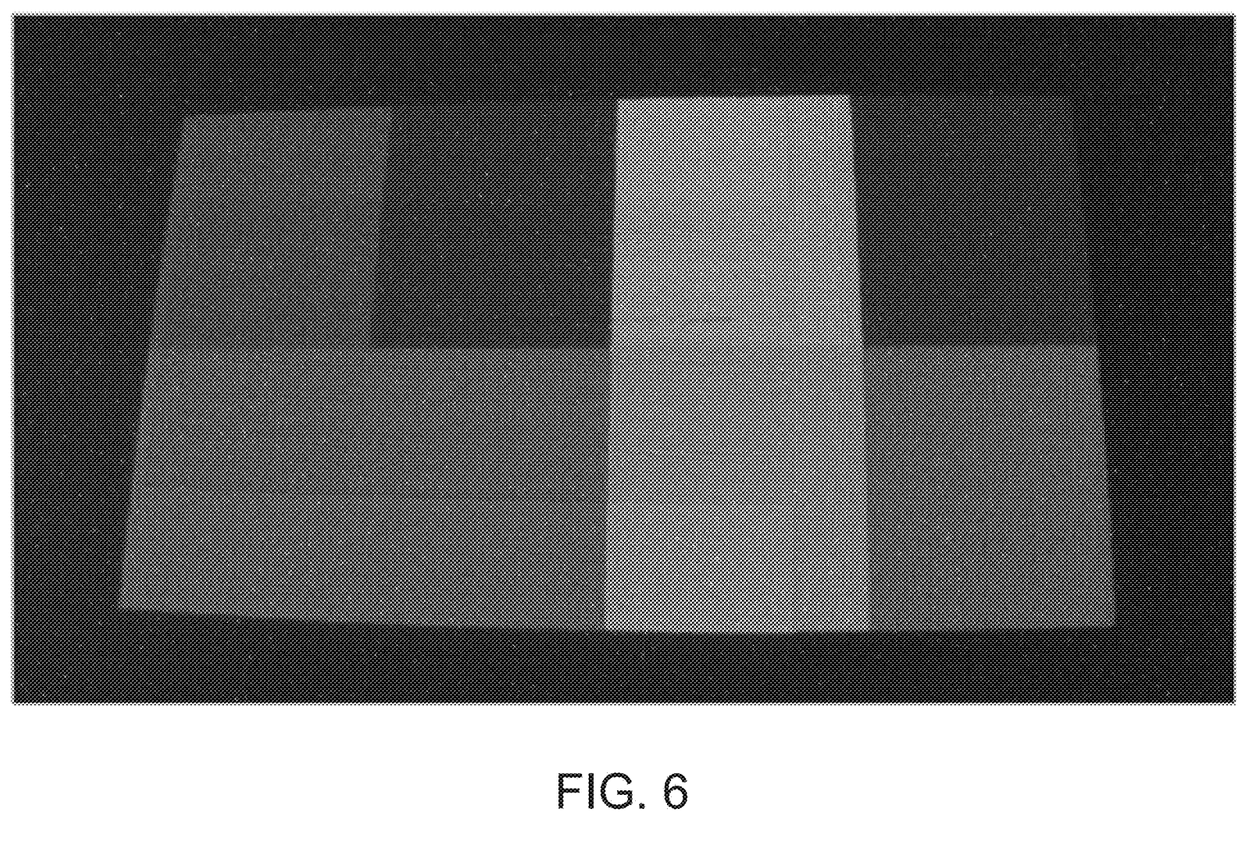
FIG. 6 shows a captured image obtained by projecting the image Img0 shown in FIG. 3 onto the projection target shown in FIG. 4 through performing the processing in the target image obtaining unit 2 and the processing in the correction unit 3.

FIG. 6 shows a captured image obtained by projecting the image Img0 shown in FIG. 3 onto the projection target shown in FIG. 4 through performing the processing in the target image obtaining unit 2 and the processing in the correction unit 3.

In the captured image in FIG. 5, the portion of the plate to be projected (the boundary between the plate and the background) can be clearly recognized. In contrast, in the captured image in FIG. 6, it is understood that the portion of the plate to be projected (the boundary between the plate and the background) is inconspicuous, and the correction processing has been preferably performed.

As described above, using the coefficient Br ($0 \leq Br \leq 1$), the projection system 1000 obtains, based on the gamma characteristic of the entire system of the projection system 1000, the target image Img_T for reducing the number of pixels saturated when the image is projected. Further, the projection system 1000 substitutes zero into the black value $B_{u, v}$ in the conversion formula based on the gamma characteristic of the entire system of the projection system 1000 and then performs processing on the obtained target image Img_T using the conversion formula, thereby obtaining the image Img_P for projection.

This reduces the number of saturated pixels of the projected image in the projection system 1000. Furthermore, even in a case or similar cases when a captured image obtained by capturing a projected image has a bad S/N ratio, image projection processing that does not cause a user discomfort in viewing the projected image (or captured image) is achieved in the projection system 1000.

Further, when the luminance (illuminance) of the light irradiated from the projection unit 5 is low (a low-luminance (low-illuminance) projector apparatus is used as the projection unit 5) and the W100%-image is projected from the projection unit 5, the projection system 1000 allows for reducing the number of saturated pixel in the projected image by adjusting the coefficient Br. Thus, even in the case of using the projection unit 5 (for example, a projector apparatus) with low illuminance (low luminance), image projection processing that does not cause a user discomfort in viewing the projected image (or captured image) is achieved in the projection system 1000.

Further, the projection system 1000 obtains a corrected image through the same processing as the processing that is performed using a target image with the black value set to zero. Thus, the projection system 1000 allows for widening the dynamic range of the corrected image. As a result, in the projection system 1000, for example, even when the luminance (illuminance) of the light irradiated from the projection unit 5 is low (for example, a projector apparatus with low illuminance (low luminance) is used as the projection unit 5), the dynamic range of the projected image can be secured widely and image projection processing that does not cause a user discomfort in viewing the projected image (or captured image) is achieved in the projection system 1000.

As described above, even when a high-illuminance (high-luminance) projector apparatus and/or a high-performance imaging apparatus are not used, the projection system 1000 appropriately reduces the luminance unevenness and color unevenness of a projected image (video), thus achieving preferable image (video) projection processing.

Other Embodiments

The projection system of the above embodiment may be achieved as a single apparatus or a part of each functional unit of the projection system may be achieved using separate apparatus(es). For example, the imaging unit 6 may be provided in the imaging apparatus, and a functional unit other than the imaging unit 6 is provided in the projector apparatus; the projection system may be achieved with the imaging apparatus and the projector apparatus.

In the projection system described in the above embodiment, each block may be individually formed into a single chip by a semiconductor device such as an LSI, or may be made into one chip so as to include a part or all of the blocks It can be done.

Although LSI is used as the semiconductor device technology, the technology may be an integrated circuit (IC), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented by a central processing unit (CPU) in a computer. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

The processes described in the above embodiments may not be performed in the order specified in the above embodiments.

The order in which the processes are performed may be changed without departing from the scope and the spirit of the invention.

The present invention may also include a computer program enabling a computer to implement the method described in the above embodiments and a computer readable recording medium on which such a program is recorded. Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program may not be recorded on the recording medium but may be transmitted with an electric communication line, a radio or cable communication line, or a network such as the Internet.

The term "unit" may include "circuitry," which may be partly or entirely implemented by using either hardware or software, or both hardware and software.

The specific structures described in the above embodiments are mere examples of the present invention, and may be changed and modified variously without departing from the scope and the spirit of the invention.

APPENDIXES

The present invention may also be expressed in the following forms.

A first aspect of the invention provides a projection system for projecting an image obtained by performing a predetermined process on an input image. The projection system includes a projection unit, an imaging unit, a gamma characteristic obtaining unit, a pixel mapping unit, a response characteristic obtaining unit, a coefficient setting unit, a target image obtaining unit, and a correction unit.

The projection unit is configured to project an image onto a projection target.

The imaging unit is configured to obtain an image projected by the projection unit as a captured image.

The gamma characteristic obtaining unit is configured to obtain a gamma characteristic determined by an optical system of the projection unit and an optical system of the imaging unit.

The pixel mapping unit is configured to obtain pixel mapping data based on a projection image, which is an image projected from the projection unit, and a captured image obtained by the imaging unit, the pixel mapping data being data for pixel-to-pixel correspondence between pixels in the captured image and pixels in the projected image.

The response characteristic obtaining unit is configured to obtain, for each pixel, a white value that is a pixel value of a captured image obtained by capturing a W100%-image projected by the projection unit using the imaging unit and a black value that is a pixel value of a captured image obtained by capturing a W0%-image projected by the projection unit using the imaging unit, and obtain a representative white value that is a representative value derived from the obtained white value and a representative black value that is a representative value derived from the obtained black value.

The coefficient setting unit is configured to set a first coefficient.

The target image obtaining unit is configured to obtain a target image from the input image based on the gamma characteristic obtained by the gamma characteristic obtaining unit and the first coefficient.

The correction unit is configured to perform correction processing on the target image based on the gamma characteristic obtained by the gamma characteristic obtaining unit, the white value, and the black value to obtain a corrected image.

The target image obtaining unit obtains the target image such that saturated pixels decrease in an image that is predicted to be captured by the imaging unit when the projection unit projects the corrected image.

Using the first coefficient, the projection system obtains a target image that reduces the number of pixels saturated when the image is projected based on the gamma characteristic of the entire system of the projection system. The projection system then performs correction processing on the obtained target image based on the gamma characteristic of the entire system of the projection system, the white value, and the black value.

This allows the projection system to reduce the number of pixels saturated in the projected image, thus achieving image projection processing that does not cause a user discomfort in viewing the projected image (or captured image) even when the dynamic range for the entire system is narrow.

Thus, the projection system appropriately reduces the luminance unevenness and color unevenness of an image (video) projected onto the projection plane by a projection-type projector apparatus without using a high-luminance (high-brightness) projector apparatus or a high-performance imaging device.

Note that "W100%-image" is an image in which pixel values of all the pixels included in the image are an upper limit value in the range of possible pixel values. For example, when the pixel value is 8-bit data ranging from 0 through 255, the pixel value of all the pixels included in the "W100%-image" is "255".

"W0%-image" is an image in which pixel values of all the pixels included in the image are a lower limit value in the range of possible pixel values. For example, when the pixel value is 8-bit data ranging from 0 through 255, the pixel value of all the pixels included in the "W0%-image" is "0".

The "target image" is, for example, an image obtained by adjusting an input image based on the gamma characteristic determined by the optical system of the projection unit and the optical system of the imaging unit, and furthermore is subjected to gain adjustment and offset adjustment such that pixel values of all the pixels included in the image are within a predetermined range.

A second aspect of the present invention provides the projection system of the first aspect of the present invention in which assuming that the input image and the target image are N-bit image (N is a natural number), a pixel value Px of the input image and a pixel value Px of the target image satisfy $0 \leq Px \leq 2^N - 1$, the first coefficient is Br satisfying 0≤Br≤1, a pixel value at coordinates (u, v) in the input image is $I_{u,v}$, a pixel value at coordinates (u, v) in the target image is $T_{u,v}$, a gamma value defining the gamma characteristic is γ, the representative white value is Wave, and the representative black value is Bmax, the target image obtaining unit obtains the target image by obtaining the pixel value $T_{u,v}$ in the target image through processing corresponding to one of the following formulae:

Formula 7

$$T_{u,v} = Br \times (W_{ave} - B_{max}) \times \left(\frac{I_{u,v}}{2^N - 1}\right)^\gamma + B_{max} \qquad (7)$$

Formula 8

$$T_{u,v} = (W_{ave} - B_{max}) \times \left(\frac{Br \times I_{u,v}}{2^N - 1}\right)^\gamma + B_{max} \qquad (8)$$

Using the coefficient Br (0≤Br≤1), the projection system obtains a target image that reduces the number of pixels saturated when the image is projected based on the gamma characteristic of the entire system of the projection system. The projection system then performs correction processing on the obtained target image based on the gamma characteristic of the entire system of the projection system, and the white value.

This allows the projection system to reduce the number of pixels saturated in the projected image, thus achieving image projection processing that does not cause a user discomfort in viewing the projected image (or captured image) even when the dynamic range for the entire system is narrow.

When the luminance (illuminance) of the light irradiated from the projection unit is low (a low-luminance (low-illuminance) projector apparatus is used as the projection unit) and the W100%-image is projected from the projection unit, the projection system allows for reducing the number of saturated pixel in the projected image by adjusting the coefficient Br. Thus, even in the case of using the projection unit (for example, a projector apparatus) with low illuminance (low luminance), image projection processing that does not cause a user discomfort in viewing the projected image (or captured image) is achieved in the projection system.

A third aspect of the present invention provides the projection system of the second aspect of the present invention in which the representative black value is zero.

Thus, the projection system obtains the target image while the representative black value Bmax is set to zero.

A fourth aspect of the present invention provides the projection system of one of the first to third aspects of the present invention in which assuming that the target image and the corrected image are N-bit image (N is a natural number), a pixel value Px of the input image and a pixel value Px of the target image satisfy 0≤Px≤2^N−1, a pixel value at coordinates (u, v) in the target image is $T_{u,v}$, a pixel value at coordinates (u, v) in the corrected image is $P_{u,v}$, a gamma value defining the gamma characteristic is γ, the white value of the pixel Px(x, y) in the captured image corresponding to the pixel Px(u, v) in the projected image is a value $W_{u,v}$, the black value of the pixel Px(x, y) in the captured image corresponding to the pixel Px(u, v) in the projected image is a value $B_{u,v}$, a first coefficient for black value adjustment is k1 satisfying 0≤k1≤1, and a second coefficient for black value adjustment is k2 satisfying 0≤k2≤1, the correction unit obtains the corrected image by obtaining the pixel value $P_{u,v}$ in the corrected image through processing corresponding to the following formula:

Formula 9

$$P_{u,v} = (2^N - 1) \times \left(\frac{T_{u,v} - k1 \times B_{u,v}}{W_{u,v} - k2 \times B_{u,v}}\right)^{\frac{1}{\gamma}} \qquad (9)$$

Using the coefficient Br (0≤Br≤1), the projection system obtains a target image that reduces the number of pixels saturated when the image is projected based on the gamma characteristic of the entire system of the projection system. The projection system adjusts the black value based on the first coefficient for black value adjustment and the second coefficient for black value adjustment, and performs processing using the adjusted black value to obtain a corrected image.

This reduces the number of saturated pixels of the projected image in the projection system. Furthermore, even in a case or similar cases when a captured image obtained by capturing a projected image has a bad S/N ratio, image projection processing that does not cause a user discomfort in viewing the projected image (or captured image) is achieved in the projection system.

In addition, the projection system obtains a corrected image through the same processing as processing performed when the black value for the target image is decreased. This allows the projection system to widen the dynamic range for the corrected image. As a result, in the projection system, for example, even when the luminance (illuminance) of the light irradiated from the projection unit is low (for example, a projector apparatus with low illuminance (low luminance) is used as the projection unit), the dynamic range of the projected image can be secured widely and image projection processing that does not cause a user discomfort in viewing the projected image (or captured image) is achieved in the projection system.

Thus, the projection system appropriately reduces the luminance unevenness and color unevenness of an image (video) projected onto the projection plane by a projection-type projector apparatus without using a high-luminance (high-brightness) projector apparatus or a high-performance imaging device.

A fifth aspect of the present invention provides the projection system of the fourth aspect of the present invention in which the first coefficient k1 for black value adjustment is zero, and the second coefficient k2 for black value adjustment is zero.

Thus, the projection system obtains a corrected image through the same processing as processing performed when the black value for the target image is set to zero. This allows the projection system to widen the dynamic range for the corrected image. As a result, in the projection system, for example, even when the luminance (illuminance) of the light irradiated from the projection unit is low (for example, a projector apparatus with low illuminance (low luminance) is used as the projection unit), the dynamic range of the projected image can be secured widely and image projection processing that does not cause a user discomfort in viewing the projected image (or captured image) is achieved in the projection system.

Thus, the projection system appropriately reduces the luminance unevenness and color unevenness of an image (video) projected onto the projection plane by a projection-type projector apparatus without using a high-luminance (high-brightness) projector apparatus or a high-performance imaging device.

A sixth aspect of the present invention provides a projector apparatus used in the projection system of one of the first to fifth aspects of the present invention.

The projector apparatus includes the projection unit, the gamma characteristic obtaining unit, the pixel mapping unit, the response characteristic obtaining unit, the coefficient setting unit, the target image obtaining unit, and the correction unit.

This achieves a projector apparatus used in the projection system of one of the first to fifth aspects of the present invention.

A seventh aspect of the present invention provides an imaging apparatus used in the projection system of one of the first to fifth aspects of the present invention. The imaging apparatus includes the imaging unit.

This achieves an imaging apparatus used in the projection system of one of the first to fifth aspects of the present invention.

An eighth aspect of the present invention provides a projection method used in a projection system including a projection unit and an imaging unit. The projection method is a method for projecting an image obtained by performing a predetermined process on an input image. The projection method includes a projection step, an imaging step, a gamma characteristic obtaining step, a pixel mapping step, a response characteristic obtaining step, a coefficient setting step, a target image obtaining step, and a correction step.

The projection step is configured to project an image onto a projection target.

The imaging step is configured to obtain an image projected by the projection step as a captured image.

The gamma characteristic obtaining step is configured to obtain a gamma characteristic determined by an optical system of the projection unit and an optical system of the imaging unit.

The pixel mapping step is configured to obtain pixel mapping data based on a projection image, which is an image projected from the projection unit, and a captured image obtained by the imaging unit, the pixel mapping data being data for pixel-to-pixel correspondence between pixels in the captured image and pixels in the projected image.

The response characteristic obtaining step is configured to obtain, for each pixel, a white value that is a pixel value of a captured image obtained by capturing a W100%-image projected by the projection unit using the imaging unit and a black value that is a pixel value of a captured image obtained by capturing a W0%-image projected by the projection unit using the imaging unit, and obtain a representative white value that is a representative value derived from the obtained white value and a representative black value that is a representative value derived from the obtained black value.

The coefficient setting step is configured to set a first coefficient.

The target image obtaining step is configured to obtain a target image from the input image based on the gamma characteristic obtained by the gamma characteristic obtaining step and the first coefficient such that saturated pixels decrease in an image that is predicted to be captured by the imaging unit when the projection unit projects the input image.

The correction step is configured to perform correction processing on the target image based on the gamma characteristic obtained by the gamma characteristic obtaining step, the white value, and the black value to obtain a corrected image.

This achieves a projection method having the same advantageous effects as the projection system of the first aspect of the present invention.

REFERENCE SIGNS LIST

1000 projection system
1 coefficient setting unit
2 target image obtaining unit
3 correction unit
4 test image generation unit
5 projection unit
6 imaging unit
7 gamma characteristic obtaining unit
8 pixel mapping unit
9 response characteristic obtaining unit

What is claimed is:

1. A projection system for projecting an image obtained by performing a predetermined process on an input image, the projection system comprising:
   projection circuitry configured to project an image onto a projection target;
   imaging circuitry configured to obtain an image projected by the projection circuitry as a captured image;
   gamma characteristic obtaining circuitry configured to obtain a gamma characteristic determined by an optical system of the projection circuitry and an optical system of the imaging circuitry;
   pixel mapping circuitry configured to obtain pixel mapping data based on a projection image, which is an image projected from the projection circuitry, and a captured image obtained by the imaging circuitry, the pixel mapping data being data for pixel-to-pixel correspondence between pixels in the captured image and pixels in the projected image;
   response characteristic obtaining circuitry configured to obtain, for each pixel, a white value that is a pixel value of a captured image obtained by capturing a W100%-image projected by the projection circuitry using the imaging circuitry and a black value that is a pixel value of a captured image obtained by capturing a W0%-image projected by the projection circuitry using the imaging circuitry, and obtain a representative white value that is a representative value derived from the obtained white value and a representative black value that is a representative value derived from the obtained black value;
   coefficient setting circuitry configured to set a first coefficient;
   target image obtaining circuitry configured to obtain a target image from the input image based on the gamma characteristic obtained by the gamma characteristic obtaining circuitry and the first coefficient; and
   correction circuitry configured to perform correction processing on the target image based on the gamma characteristic obtained by the gamma characteristic obtaining circuitry, the white value, and the black value to obtain a corrected image, and wherein
   the target image obtaining circuitry obtains the target image such that saturated pixels decrease in an image that is predicted to be captured by the imaging circuitry when the projection circuitry projects the corrected image.

2. The projection system according to claim 1, wherein assuming that the input image and the target image are N-bit image (N is a natural number), a pixel value Px of the input image and a pixel value Px of the target image satisfy 0≤Px≤2^N−1, the first coefficient is Br satisfying 0≤Br≤1, a pixel value at coordinates (u, v) in the input image is $I_{u,v}$, a pixel value at coordinates (u, v) in the target image is $T_{u,v}$, a gamma value defining the gamma characteristic is γ, the representative white value is Wave, and the representative black value is Bmax, the target image obtaining circuitry obtains the target image by obtaining the pixel value $T_{u,v}$ in the target image through processing corresponding to one of the following formulae:

$$T_{u,v} = Br \times (W_{ave} - B_{max}) \times \left(\frac{I_{u,v}}{2^N - 1}\right)^\gamma + B_{max} \quad \text{(cl2a)}$$

$$T_{u,v} = (W_{ave} - B_{max}) \times \left(\frac{Br \times I_{u,v}}{2^N - 1}\right)^\gamma + B_{max}. \quad \text{(cl2b)}$$

3. The projection system according to claim 2, wherein the representative black value is zero.

4. The projection system according to claim 1, wherein assuming that the target image and the corrected image are N-bit image (N is a natural number), a pixel value Px of the input image and a pixel value Px of the target image satisfy 0≤Px≤2^N−1, a pixel value at coordinates (u, v) in the target image is $T_{u,v}$, a pixel value at coordinates (u, v) in the corrected image is $P_{u,v}$, a gamma value defining the gamma characteristic is γ, the white value of the pixel Px(x, y) in the captured image corresponding to the pixel Px(u, v) in the projected image is a value $W_{u,v}$, the black value of the pixel Px(x, y) in the captured image corresponding to the pixel Px(u, v) in the projected image is a value $B_{u,v}$, a first coefficient for black value adjustment is k1 satisfying 0≤k1≤1, and a second coefficient for black value adjustment is k2 satisfying 0≤k2≤1, the correction circuitry obtains the corrected image by obtaining the pixel value $P_{u,v}$ in the corrected image through processing corresponding to the following formula:

$$P_{u,v} = (2^N - 1) \times \left(\frac{T_{u,v} - k1 \times B_{u,v}}{W_{u,v} - k2 \times B_{u,v}}\right)^{\frac{1}{\gamma}}. \quad \text{(cl4)}$$

5. The projection system according to claim 4, wherein the first coefficient k1 for black value adjustment is zero, and the second coefficient k2 for black value adjustment is zero.

6. A projector apparatus used in the projection system according to claim 1, the projector apparatus comprising the projection circuitry, the gamma characteristic obtaining circuitry, the pixel mapping circuitry, the response characteristic obtaining circuitry, the coefficient setting circuitry, the target image obtaining circuitry, and the correction circuitry.

7. An imaging apparatus used in the projection system according to claim 1, the imaging apparatus comprising the imaging circuitry.

8. A method used in a projection system comprising projection circuitry and imaging circuitry, the projection method being a method for projecting an image obtained by performing a predetermined process on an input image, the projection method comprising:

projecting an image onto a projection target;

obtaining an image projected by the projection step as a captured image;

obtaining a gamma characteristic determined by an optical system of the projection circuitry and an optical system of the imaging circuitry;

obtaining pixel mapping data based on a projection image, which is an image projected from the projection circuitry, and a captured image obtained by the imaging circuitry, the pixel mapping data being data for pixel-to-pixel correspondence between pixels in the captured image and pixels in the projected image;

obtaining, for each pixel, a white value that is a pixel value of a captured image obtained by capturing a W100%-image projected by the projection circuitry using the imaging circuitry and a black value that is a pixel value of a captured image obtained by capturing a W0%-image projected by the projection circuitry using the imaging circuitry, and obtaining a representative white value that is a representative value derived from the obtained white value and a representative black value that is a representative value derived from the obtained black value;

setting a first coefficient;

obtaining a target image from the input image based on the gamma characteristic obtained by the gamma characteristic obtaining step and the first coefficient such that saturated pixels decrease in an image that is predicted to be captured by the imaging circuitry when the projection circuitry projects the input image; and performing correction processing on the target image based on the gamma characteristic obtained by the gamma characteristic obtaining step, the white value, and the black value to obtain a corrected image.

* * * * *